United States Patent Office 3,313,784
Patented Apr. 11, 1967

3,313,784
HARDENING OF POLYMERS CONTAINING CARBOXYL GROUPS
Marcel Nicolas Vrancken, Berchem-Antwerp, Jozef Frans Willems, Wilrijk-Antwerp, August Jean Van Paesschen, Hove, and José Thérèse Lemmerling, Edegem, Belgium, assignors to Gevaert Photo-Producten N.V., Mortsel, Belgium, a Belgium company
No Drawing. Filed July 9, 1962, Ser. No. 208,561
Claims priority, application Belgium, May 7, 1962, 41,626
4 Claims. (Cl. 260—78.4)

This invention relates to a method for hardening carboxyl groups containing polymers and more particularly to a method for rendering these polymers insoluble in water.

It is known to harden carboxyl groups containing polymers by heating them in the presence of compounds having in their molecule at least one primary or secondary amino group (German patent specification 864,151).

A process has now been found for rendering carboxyl groups containing polymers insoluble in water by reacting these polymers with compounds bearing two active halogen atoms and corresponding to the formula:

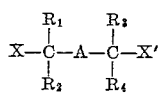

wherein:

each of X and X' (the same or different) represents a halogen atom e.g. a chlorine atom or a bromine atom, each of $R_1$, $R_2$, $R_3$ and $R_4$ (the same or two or more of them different) represents a hydrogen atom or an alkyl group, and A represents an arylene radical, a —CO—O-alkylene-O—CO— group,
a —CO—O-arylene-O—CO— group,
a —CO—NH—CO—NH—CO— group,
a —CO—NH—CO—CO—NH—CO— group,
a —CO—NH—CO-alkylene-CO—NH—CO— group,
a —CO—NH—CO-arylene-CO—NH—CO— group,
a —CO—NH—SO$_2$-alkylene-SO$_2$—NH—CO— group,
a —CO—NR—CO— group,
a —CO—NR—NR—CO— group,
a —CO—NR-alkylene-NR—CO— group,
a —CO—NR-arylene-NR—CO— group, wherein R represents a hydrogen atom or an alkyl group.

In addition to homopolymers and copolymers prepared from acrylic acid, methacrylic acid, fumaric acid, maleic acid, itaconic acid, citraconic acid and the like, the semi-esters of polyvinyl alcohol and dicarboxylic acids such as phthalic acids, maleic acid, succinic acid etc. can also be used as carboxyl groups containing polymers. Moreover, natural products or their carboxyl groups containing substitution products can be hardened to water-insoluble products according to the process of this invention. Examples of these latter products are: alginic acid, pectine, the monoesters of dicarboxylic acids and cellulose, starch, amylopectine and the semi-esters and semi-ethers thereof, or carboxyalkyl and carboxyaryl derivatives of these natural polymers such as carboxymethyl cellulose.

All these carboxyl groups containing polymers can be hardened according to the process of the invention by reacting them with compounds bearing at least two active halogen atoms and corresponding to the above formula.

Among the compounds which have the above general formula we particularly refer to the following:
Methylene-bis-chloroacetamide

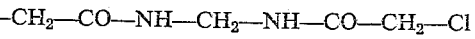

which can be prepared according to Ann. 343, 284 (1905);
Bis(chloroacetyl)-amine

which can be prepared according to J. Prakt. Chem. [2] 69, 11 (1904);
N,N'-bis(chloroacetyl)-ethylenediamine

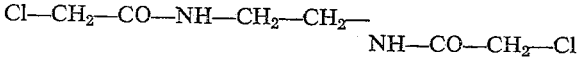

which can be prepared according to J. Chem. Soc. (1947), 129;
p-Xylene dibromide

which can be prepared according to Ann. 155, 340 (1870);
N,N'-bis(chloroacetyl)-hydrazine

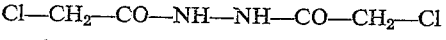

which can be prepared according to German patent specification 819,405;
N,N'-bis(chloroacetyl)-urea

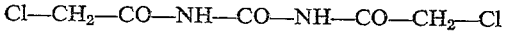

which can be prepared according to Receuil Trav. Chim. des Pays-Bas, 31, 119 (1912);
N,N'-bis(α-bromopropionyl)-ethylenediamine

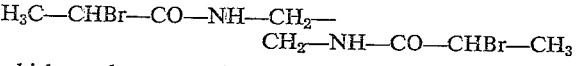

which can be prepared according to Z. Physiolog. Chem. 123, 280 (1922);
1,2-bis(monobromoacetoxy)-ethane

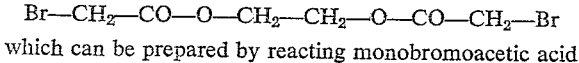

which can be prepared by reacting monobromoacetic acid with ethylene dioxide;
N,N'-dibromoacetylethylenediamine

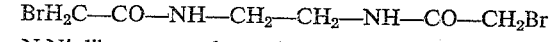

N,N'-dibromoacetylpropylenediamine-1,3

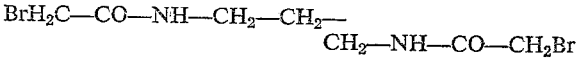

N,N'-bis(bromoacetyl)-hydrazine

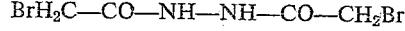

N,N'-bis(chloroacetyl)-dimethylhydrazine

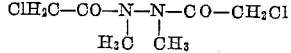

N,N'-bis(bromoacetyl)-dimethylhydrazine

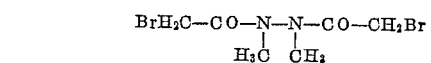

N,N'-dibromoacetylethylene diamine can be prepared as follows:

To a solution of 100 g. (0.5 mol) of bromoacetyl bromide in 500 cm.³ of chloroform is added dropwise over a few hours and whilst cooling a solution of 37 g. of ethylene diamine (0.6 mol) in 100 cm.³ of chloroform. The suspension is still stirred for a few hours at 5–10° C. A white precipitate is obtained which is washed with water and recrystallized from dioxane. Melting point: 150° C.
*Analysis.*—Br, percent calculated: 53; found: 53.05. N, percent calculated: 9.27; found: 9.31, 9.35.

N,N'-dibromoacetylpropylenediamine-1,3 can be prepared as follows:

100 g. (0.5 mol) of bromoacetylbromide is dissolved in 500 cm.³ of chloroform. Over a few hours is dropwise added whilst cooling a solution of 44.5 g. of trimethylenediamine (0.6 mol) in 100 cm.³ of chloroform. The formed suspension is stirred for a few hours at 0–5° C. and the obtained white precipitate is sucked off and thoroughly washed with water. The residue is recrystallized from water. Melting point: 106° C.

*Analysis.*—Br, percent calculated: 50.6; found: 51. N, percent calculated: 8.86; found: 8.86, 8.68. C, percent calculated: 26.6; found: 26.63. H, percent calculated: 3.8; found: 3.89.

N,N'-bis(bromoacetyl)-hydrazine is prepared as follows:

52 g. of bromoacetic anhydride are dissolved in dioxane. 7.6 g. of hydrazinecarboxylic acid are then added at 40° C. whilst stirring and carbon dioxide escapes. The reaction mixture is then stirred for ½ hour at the same temperature. A precipitate is formed which is sucked off and recrystallized from a mixture of alcohol and water. Yield: 43%. Melting point: 205° C.

N,N'-bis(chloroacetyl)-dimethylhydrazine is prepared as follows:

106 g. of sodium carbonate and 45 g. of dimethylhydrazine hydrochloride are dissolved in 750 cm.³ of water. Then 100 g. of chloroacetylchloride are dropwise added at 25° C. A white precipitate is formed. After cooling and sucking off, the product obtained is recrystallized from water. Yield: 20 g. Melting point: 120° C.

*Analysis.*—N, percent calculated: 13.15; found: 13.53, 13.33. Cl, percent calculated: 33.29; found: 33.66, 33.97.

N,N'-bis(bromoacetyl)-dimethylhydrazine is prepared as follows:

21.2 g. of sodium carbonate and 9 g. of dimethylhydrazine are dissolved in 150 cm.³ of water. Next 28 g. of bromoacetyl chloride are dropwise added at 25° C. A white precipitate is formed. After cooling, this precipitate is sucked off and recrystallized from water. Yield: 7.5 g. Melting point: 96° C.

*Analysis.*—N, percent calculated: 9.4; found: 10. Br, percent calculated: 53.7; found: 54.4.

According to an embodiment of the invention, the carboxyl groups containing polymer together with the compound bearing active halogen atoms are coated onto a support from a common solution in water, in an organic solvent or in a mixture of both, whereupon the solvent is evaporated by heat or removed by any other method. In this way a film or a covering layer of the polymer is obtained. Already after a very short time the polymer is cross-linked by means of the compound bearing active halogen atoms, whereby the film or layer which is formed from the polymer becomes insoluble.

The compounds bearing active halogen atoms can also be taken up by the carboxyl groups containing polymers in another way. In this way shaped articles such as films, layers, threads etc. which are prepared from the carboxyl groups containing polymer can be immersed in a solution of the compound bearing active halogen atoms. Of course, in this case a solvent has to be used wherein the polymer itself is insoluble or which is at most a swelling agent for the carboxyl groups containing polymer. The solvent is at least superficially taken up by the polymer whereby the active halogen atoms can react with the carboxyl group of the polymer, this giving rise, at least superficially, to cross-linking and insolubilization of the polymer.

The carboxyl groups containing polymers which are hardened according to the process of this invention are insoluble in water, they are considerably more thermostable and generally their swelling power in organic solvents is also decreased. The number of cross-links which arise by the reaction of the halogen atoms with the carboxyl groups are determined by the number of carboxyl groups which are present in the polymer and by their ratio to the number of compounds bearing active halogen atoms.

The polymers which are hardened in this way possess more possibilities for application in the industry. So alginic acid is very much used as a sizing agent in the textile industry and if it is treated according to the process of the present invention, it resists to the action of all kinds of detergents.

According to the invention a large series of water-insoluble polymers can be obtained, which were soluble in a preceding step and thus can easily be worked up. So, covering layers can be coated onto wood, textile, paper, fibres, metals etc. from aqueous solutions of these carboxyl groups containing polymers which contain the hardening agents according to the invention, whereby the formed layers become water-insoluble after drying.

These carboxyl groups containing polymers are used on a very large scale in the photographic industry. Up to now the carboxyl groups containing polymers have been used for the manufacture of all kinds of layers such as: layers of which the binding agent of the light-sensitive silver halide and other salts wholly or partly consists of these polymers, subbing layers, antistatic layers, filter layers, anti-stress layers, all kinds of interlayers etc. This enumeration relates to materials used in the common black-white photography, the colour photography or the photomechanical reproduction technique as well as to materials used in X-ray photography, electrophotography and reproduction techniques by means of silver complex diffusion transfer.

The following examples illustrate the invention.

*Example 1*

To 100 cm.³ of a 5% neutralized aqueous solution of the semi-ester of maleic acid and polyvinyl alcohol prepared according to the method of the British patent specification 822,061 and containing 16% of vinyl maleate groups, 5 cm.³ of a 5% solution of N,N'-bis(bromoacetyl)-ethylene diamine in dimethylformamide are added.

The solution is brought at pH 7, coated onto glass-plates and dried at room temperature. Already after some days of storage the obtained layers resist a treatment in boiling water whereas a layer containing no N,N'-bis(bromoacetyl)-ethylene diamine even dissolves in cold water.

*Example 2*

To 100 cm.³ of a 5% aqueous solution of sodium alginate, 1 cm.³ of a 5% solution of N,N'-bis(bromoacetyl)-ethylene diamine in dimethyl formamide is added. The solution is brought at pH 7, coated onto glass-plates and dried at room temperature. Already after some days of storage the obtained layers resist a treatment in boiling water.

*Example 3*

To 100 cm.³ of a 5% neutralized aqueous solution of the semi-ester of o-phthalic acid and polyvinyl alcohol containing 20% of o-phthalyl groups, 5 cm.³ of a 5% solution of N,N'-bis(bromoacetyl)-ethylene diamine in dimethyl formamide are added.

The solution is brought at pH 8, coated onto glass-plates and dried at room temperature. Already after some days of storage the obtained layers resist a treatment in boiling water.

*Example 4*

(a) To 100 cm.³ of a 5% aqueous solution of a copoly [styrene/acrylic acid] containing 36.4% by weight of acrylic acid, 10 cm.³ of a 5% solution of N,N'-bis(bromoacetyl)-ethylene diamine in dimethyl formamide are added. The solution is brought at pH 7, coated onto glass-plates and dried at room temperature. After 36 hours of storage at 55° C. and 37% relative humidity such layers resist to a treatment in water at 80° C. They resist much better mechanical damage than layers which are coated from a solution containing no hardening agent.

(b) When the above copolystyrene/acrylic acid is replaced by copolystyrene/methacrylic acid containing 65.8% by weight of methacrylic acid an analogous hardening is reached.

*Example 5*

To 100 cm.³ of a 10% aqueous solution of cellulose acetomaleate with a substitution degree of 2.2 of acetyl groups and 0.45 of monomaleyl groups, 5 cm.³ of a 10% solution of N,N′-bis(bromoacetyl)-ethylene diamine in dimethyl formamide are added. The solution is brought at pH 7, coated onto glass-plates and dried at room temperature.

After 36 hours of storage at 55° C. and 37% relative humidity such layers resist a treatment in boiling water without dissolving.

*Example 6*

To 100 cm.³ of a 10% neutralized aqueous solution of the semi-ester of maleic acid and polyvinyl alcohol which is prepared according to the method of the British patent specification 822,061 and which contains 14% of vinyl maleate groups, 20 cm.³ of a 5% solution of 1,2-bis(monobromoacetoxy)-ethane in ethanol are added. The solution is brought at pH 7, coated onto glass-plates and dried. After 36 hours of storage at 55° C. and 37% relative humidity such layers resist a treatment in water of 80° C. without dissolving.

*Example 7*

To 100 cm.³ of a 10% aqueous solution of the semi-ester of maleic acid and polyvinyl alcohol, prepared as described in the British patent specification 822,061 and containing 16% of maleate groups, 20 cm.³ of a 5% solution of p-xylene dibromide in dimethyl formamide are added. This solution is brought at pH 7, coated onto glass-plates and dried at room temperature. After 36 hours of storage at 55° C. and 37% relative humidity such layers resist a treatment in water of 90° C. without dissolving.

*Example 8*

1 kg. of a highly sensitive photographic silver halide emulsion containing as a binding agent the sodium salt of the semi-ester of maleic acid and polyvinyl alcohol, prepared according to the British patent specification 822,061 and containing 16% of vinyl maleate groups is prepared. To this emulsion 30 cm.³ of a 10% solution of N,N′-bis(bromoacetyl)-ethylenediamine in dimethyl formamide are added. The emulsion is coated onto a support and dried.

Already after a very short period of storage, the obtained emulsion layer resists mechanical damage during processing very well, whereas an emulsion layer containing no poly(vinyl monomaleate) already dissolves in cold water.

*Example 9*

To 100 cm.³ of a 5% aqueous solution of a copoly [styrene/maleic acid], 2 cm.³ of a 5% solution of N,N′-bis(bromoacetyl)-ethylenediamine are added. This solution is coated onto glass-plates and dried.

Already after some days of storage such layers are insoluble in boiling water. A layer coated from the solution of the copolymer to which no hardening agent has been added already dissolves in cold water.

*Example 10*

To 100 cm.³ of a 5% aqueous solution at pH 7 of ethyl cellulose succinate with a substitution degree of 2.2 of ethyl groups and 0.5 of succinyl groups, 1 cm.³ of a 5% solution of N,N′-bis(bromoacetyl)-ethylene diamine in dimethylformamide is added. The solution is coated onto glass-plates and dried.

Already after some days of storage at room temperature the thus formed layers do not dissolve anymore, even in boiling water. Layers which have been coated from a solution of ethyl cellulose succinate to which no hardening agent has been added, already completely dissolved at 30° C.

*Example 11*

Example 10 is repeated but the amount of ethyl cellulose succinate is replaced by a same amount of amylopectine-o-phthalate with a substitution degree of 0.35 of o-phthalyl groups. Already after some days of storage, the formed layers do not dissolve anymore, even in boiling water.

*Example 12*

Example 10 is repeated but the amount of ethyl cellulose succinate is replaced by a same amount of ethyl cellulose maleate with a substitution degree of 2.25 of ethyl groups and 0.5 of maleate groups. Instead of 1 cm.³ of a 5% solution of N,N′-bis(bromoacetyl)-ethylene diamine in dimethyl formamide, 5 cm.³ of the same solution are added. Already after some days of storage at room-temperature the formed layers do not dissolve anymore, even in boiling water.

*Example 13*

To a 5% aqueous solution of ethyl cellulose-o-phthalate with a substitution degree of 2.25 of ethyl groups and 0.35 of o-phthalyl groups, 1 cm.³ of a 5% solution of N,N′-bis(bromoacetyl)-ethylene diamine in dimethyl formamide is added. The solution is coated onto glass-plates and dried. After some days of storage at room temperature the formed layers resist processing in boiling water.

We claim:

1. The method of hardening a polymer containing carboxyl groups, which method comprises contacting said polymer with a compound having the formula

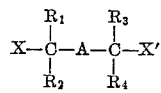

wherein:
each of X and X′ represents a halogen atom selected from the group consisting of chlorine and bromine,
each of $R_1$, $R_2$, $R_3$ and $R_4$ represents a member selected from the group consisting of a hydrogen atom and an alkyl group, and
A represents a member selected from the group consisting of
an arylene group,
a —CO—O-alkylene-O—CO— group,
a —CO—O-arylene-O—CO— group,
a —CO—NH—CO—NH—CO— group,
a —CO—NH—CO—CO—NH—CO— group,
a —CO—NH—CO-alkylene-CO—NH—CO— group,
a —CO—NH—CO-arylene-CO—NH—CO— group,
a —CO—NH—SO₂-alkylene-SO₂—NH—CO— group,
a —CO—NH—CO— group,
a —CO—N(alkyl)—CO— group,
a —CO—NH—NH—CO— group,
a —CO—N(alkyl)—NH—CO group,
a —CO—N(alkyl)—N(alkyl)—CO— group,
a —CO—NH-alkylene-NH—CO— group,
a —CO—N(alkyl)-alkylene-NH—CO— group,
a —CO—N(alkyl)-alkylene-N(alkyl)—CO— group,
a —CO—NH-arylene-NH—CO— group,
a —CO—N(alkyl)-arylene-NH—CO— group and
a —CO—N(alkyl)-arylene-N(alkyl)—CO— group.

2. The method of rendering water-insoluble normally water-soluble polymers containing carboxyl groups, which method comprises contacting said polymer with a compound having the formula

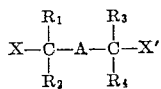

wherein:
each of X and X' represents a halogen atom selected from the group consisting of chlorine and bromine,
each of $R_1$, $R_2$, $R_3$ and $R_4$ represents a member selected from the group consisting of a hydrogen atom and an alkyl group, and
A represents a member selected from the group consisting of
an arylene group,
a —CO—O-alkylene-O—CO— group,
a —CO—O-arylene-O—CO— group,
a —CO—NH—CO—NH—CO— group,
a —CO—NH—CO—CO—NH—CO— group,
a —CO—NH—CO-alkylene-CO—NH—CO— group,
a —CO—NH—CO-arylene-CO—NH—CO— group,
a —CO—NH—SO$_2$-alkylene-SO$_2$—NH—CO— group,
a —CO—NH—CO— group,
a —CO—N(alkyl)—CO— group,
a —CO—NH—NH—CO— group,
a —CO—N(alkyl)—NH—CO— group,
a —CO—N(alkyl)—N(alkyl)—CO— group,
a —CO—NH-alkylene-NH—CO— group,
a —CO—N(alkyl)-alkylene-NH—CO— group,
a —CO—N(alkyl)-alkylene-N(alkyl)—CO— group,
a —CO—NH-arylene-NH—CO— group,
a —CO—N(alkyl)-arylene-NH—CO— group and
a —CO—N(alkyl)-arylene-N(alkyl)—CO— group.

3. The method of claim 1 wherein said polymers and said compound are contacted by the steps comprising mixing said compound with a solution of said polymer and thereafter evaporating the solvent.

4. A shaped article prepared by the method of claim 1.

References Cited by the Examiner
UNITED STATES PATENTS
3,002,837  10/1961  Burgardt et al. _____ 96—84

FOREIGN PATENTS
860,632  2/1961  Great Britain.
880,485  6/1953  Germany.

OTHER REFERENCES
Verderame: Chem. Abstracts, vol. 55, No. 19, Sept. 18, 1961, col. 18578g.
Berberian et al.: Chem. Abstracts, vol. 56, No. 6, March 19, 1962, col. 6604a.

JOSEPH L. SCHOFER, *Primary Examiner.*
NORMAN G. TORCHIN, *Examiner.*
A. LIBERMAN, L. G. CHILDERS, *Assistant Examiners.*